US012789608B2

(12) United States Patent
Stefani et al.

(10) Patent No.: US 12,789,608 B2
(45) Date of Patent: Nov. 10, 2026

(54) ELECTRIC DRIVE SYSTEM AND METHOD FOR DRIVE SYSTEM OPERATION

(71) Applicant: DANA ITALIA S.R.L., Arco (IT)

(72) Inventors: Matteo Stefani, Reggio Emilia (IT); Fabrizio Zendri, Rovereto (IT)

(73) Assignee: DANA ITALIA S.R.L., Arco (IT)

( * ) Notice: Subject to any disclaimer, the term of this patent is extended or adjusted under 35 U.S.C. 154(b) by 350 days.

(21) Appl. No.: 18/467,558

(22) Filed: Sep. 14, 2023

(65) Prior Publication Data

US 2025/0091420 A1 Mar. 20, 2025

(51) Int. Cl.
*B60K 1/02* (2006.01)
*B60R 16/03* (2006.01)

(52) U.S. Cl.
CPC ................ *B60K 1/02* (2013.01); *B60R 16/03* (2013.01); *B60Y 2200/20* (2013.01)

(58) Field of Classification Search
CPC .......... B60K 1/02; B60K 1/00; B60K 7/0007; B60K 7/00; B60K 2007/0046; B60K 2007/0061; B60K 25/06; B60K 25/00; B60K 2025/005; B60R 16/00; B60R 16/02; B60R 16/03; B60Y 2200/20; B60Y 2300/423; B60Y 2300/42; B60L 50/62; B60L 15/20; B60L 15/2054; B60L 2240/421; B60L 2240/423; B60L 2240/486; B60L 2240/507; B60L 2240/42; B60L 2240/48; B60L 2240/50
See application file for complete search history.

(56) References Cited

U.S. PATENT DOCUMENTS

| | | | | |
|---|---|---|---|---|
| 4,270,622 | A * | 6/1981 | Travis | B60L 3/0061 475/5 |
| 4,686,442 | A | 8/1987 | Radomski | |
| 4,723,105 | A | 2/1988 | Matouka et al. | |
| 7,610,973 | B2 | 11/2009 | Asao et al. | |
| 8,140,205 | B2 * | 3/2012 | Hanyu | B60K 6/48 322/29 |
| 8,225,893 | B2 * | 7/2012 | Yamada | B60W 10/08 180/65.265 |
| 8,818,588 | B2 * | 8/2014 | Ambrosio | B60W 20/00 180/65.21 |
| 9,140,335 | B2 * | 9/2015 | Knoblauch | B60K 17/046 |
| 9,365,114 | B2 | 6/2016 | Kim et al. | |
| 9,441,599 | B2 * | 9/2016 | Bangura | F02N 11/04 |

(Continued)

FOREIGN PATENT DOCUMENTS

| | | | |
|---|---|---|---|
| CN | 108791120 | A | 11/2018 |
| CN | 113348101 | A | 9/2021 |

(Continued)

*Primary Examiner* — James M Dolak
(74) *Attorney, Agent, or Firm* — McCoy Russell LLP

(57) ABSTRACT

Systems and methods for an electric drive system. The electric drive system, in one example, includes a gearbox that includes a first shaft rotationally coupled to a higher voltage electric motor and a second shaft rotationally coupled to a lower voltage electric generator and motor assembly. The electric drive system further includes an inverter electrically coupled to the higher voltage electric motor and an energy storage device and in such an example, the lower voltage electric generator and motor assembly is configured to rotationally couple to an auxiliary device.

11 Claims, 2 Drawing Sheets

(56) References Cited

U.S. PATENT DOCUMENTS

| | | | | |
|---|---|---|---|---|
| 9,647,582 | B2 | 5/2017 | Bangura et al. | |
| 10,293,813 | B2 * | 5/2019 | Takayama | B60W 10/06 |
| 11,215,156 | B2 | 1/2022 | Ciaccio et al. | |
| 11,312,218 | B2 * | 4/2022 | Serrao | B60K 17/02 |
| 11,358,476 | B2 * | 6/2022 | Matsubara | F02N 11/006 |
| 11,498,403 | B2 * | 11/2022 | McGrew, Jr. | B60K 17/04 |
| 11,590,841 | B2 * | 2/2023 | Cook | B60K 17/165 |
| 11,639,110 | B2 * | 5/2023 | Shidore | B60H 1/004<br>180/53.4 |
| 11,655,863 | B1 * | 5/2023 | Versini | B60K 1/02<br>475/5 |
| 11,833,898 | B2 * | 12/2023 | Engerman | B60K 1/00 |
| 11,850,928 | B2 * | 12/2023 | Seemann | B60K 1/02 |
| 11,884,151 | B1 * | 1/2024 | Cattoor | F16H 57/0442 |
| 12,214,658 | B2 * | 2/2025 | Sigmon | B60K 17/02 |
| 12,247,649 | B2 * | 3/2025 | Schilder | F16H 37/0806 |
| 12,491,775 | B2 * | 12/2025 | David | B60L 15/2009 |
| 2005/0280400 | A1 | 12/2005 | Ooiwa | |
| 2010/0133023 | A1 * | 6/2010 | Tang | B60K 7/0007<br>180/65.1 |
| 2012/0112533 | A1 | 5/2012 | Yarmak et al. | |
| 2012/0221197 | A1 * | 8/2012 | Hisada | B60L 1/003<br>74/665 F |
| 2023/0151856 | A1 * | 5/2023 | Versini | B60K 1/02<br>475/5 |

FOREIGN PATENT DOCUMENTS

| | | | |
|---|---|---|---|
| JP | 2019083687 | A | 5/2019 |
| KR | 20120062956 | A | 6/2012 |
| RU | 195930 | U1 | 2/2020 |

* cited by examiner

ELECTRIC DRIVE SYSTEM AND METHOD FOR DRIVE SYSTEM OPERATION

TECHNICAL FIELD

The present disclosure relates to an electric drive system with a higher voltage electric motor and a lower voltage electric generator.

BACKGROUND AND SUMMARY

Electric vehicles make use of electric drive units to generate motive power and provide an attractive alternative in terms of hydrocarbon emissions in relation to vehicles that solely rely on internal combustion engines for propulsion. Some vehicles have relatively high power demands. However, as a vehicle's power demand increases it may be more difficult to fulfill power demands of lower voltage devices in the vehicle. To elaborate, the power demands of some auxiliary systems is much lower than traction motors and particularly traction motors for larger vehicles with high power demands.

Some vehicle systems have included a higher voltage generator and a lower voltage generator. However, this type of system demands that the generators be driven by an external motor or internal combustion engine. Other attempts have been made to provide electrical power to lower voltage auxiliary systems via a separate lower voltage electrical system that includes a specific battery pack. However, the inventors have recognized several drawbacks with the use of a separate lower voltage electrical system with a dedicated battery pack. For instance, the space efficiency of the system is decreased and the likelihood of component degradation is increased in systems that utilize a lower voltage battery pack. Further, the use of a standalone lower voltage electrical system may demand additional maintenance and/or servicing, in some instances.

Facing the abovementioned issues, the inventors developed an electric drive system to at least partially overcome at least a portion of the issues. In one example, the electric drive system includes a gearbox. In such an example, the gearbox includes a first shaft rotationally coupled to a higher voltage electric motor and a second shaft rotationally coupled to a lower voltage electric motor-generator assembly. The electric drive system further includes an inverter that is electrically coupled to the higher voltage electric motor and an energy storage device. Further, in such an example, the lower voltage electric generator is configured to electrically couple to an auxiliary device. Using the lower voltage electric motor-generator assembly allows the auxiliary device to be effectively driven via a space efficient assembly. In such an example, a lower voltage energy storage device (e.g., a lower voltage battery) may be omitted from the system, which reduces system complexity and increases system compactness. Further, in one example, the lower voltage electric generator and motor assembly includes a lower voltage generator that is rotationally coupled to the second shaft and a lower voltage electric motor electrically coupled to the lower voltage generator and rotationally coupled to the auxiliary device. In this way, power is efficiently transferred to the auxiliary device.

Still further in one example, the electric drive system may additionally include a disconnect clutch which is configured to selectively disconnect the lower voltage electric generator and motor assembly from the second shaft. In this way, the lower voltage electric generator and motor assembly may be disconnected when auxiliary device operation is not desired, thereby increasing system efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
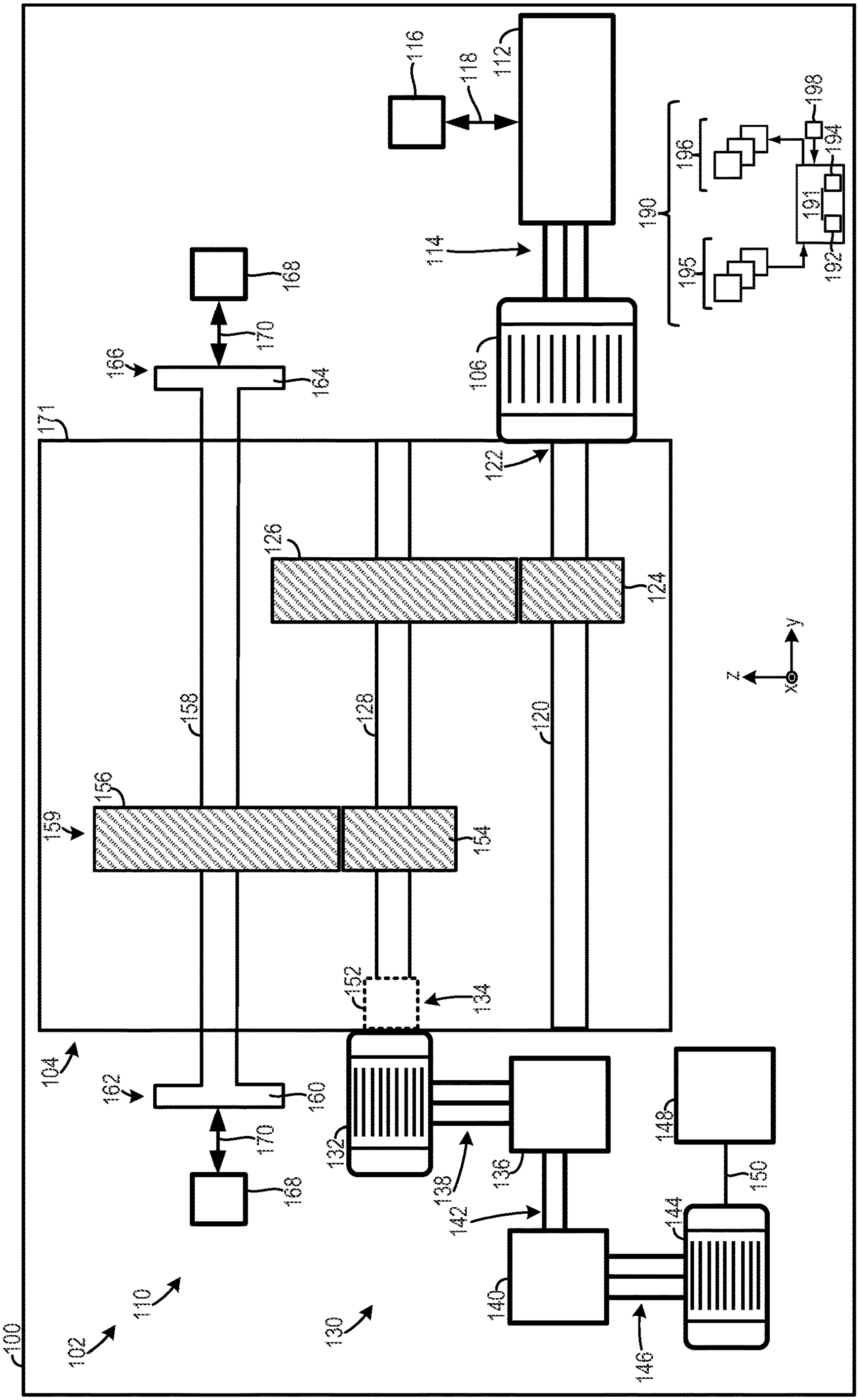
FIG. 1 shows a schematic depiction of an electric drive system in an electric vehicle (EV).

FIG. 1 shows a depiction of an electric vehicle (EV) 100. The EV may be an all-electric vehicle (e.g., a battery electric vehicle (BEV)), in one example, or a hybrid electric vehicle (HEV) with an internal combustion engine, in another example.

The vehicle may be a passenger vehicle, a commercial vehicle, an on-highway vehicle, or an off-highway vehicle, in different examples. Specifically, in one use-case example, the EV 100 may be an off-highway vehicle. An off-highway vehicle may be a vehicle whose size and/or maximum speed precludes the vehicle from being operated on highways for extended durations. For instance, the vehicle's width may be greater than a highway lane and/or the vehicle top speed may be below the highway's minimum allowable or suggested speed, for example. Industries and their corresponding operating environments in which the off-highway vehicle may be deployed include construction, forestry, mining, agriculture, and the like.

In the vehicle example, the vehicle 100 includes a powertrain 102 with a gearbox 104 and a higher voltage electric motor 106. At least a portion of the gearbox 104, the higher voltage electric motor 106, and a lower voltage electric generator and motor assembly 130 discussed in greater detail herein, are included in an electric drive system 110.

The higher voltage electric motor 106 may be a higher voltage electric traction motor. The higher voltage electric motor 106 includes a rotor that electromagnetically interacts with a stator to drive rotation of a rotor shaft which is included in the rotor. The higher voltage electric traction motor may further include a housing, bearings coupled to the rotor shaft, and the like.

In the illustrated example, the higher voltage electric motor 106 is a multi-phase alternating current (AC) motor. However, other suitable types of higher voltage electric motors have been contemplated. Further, in the illustrated example, the higher voltage electric motor 106 is electrically coupled to a higher voltage inverter 112 (e.g., a higher voltage AC drive) via an AC electrical connection 114 (e.g., multiphase bus bars, wires, and the like). The higher voltage inverter 112 is designed to convert DC power to AC power and vice versa.

The higher voltage inverter 112 may receive electric energy from one or more higher voltage energy storage device(s) 116 (e.g., traction batteries, capacitors, combinations thereof, and the like). A DC electrical connection (as denoted via arrows 118) is formed between the higher voltage inverter 112 and the higher voltage energy storage device 116. The DC electrical connection 118 may specifically include a higher voltage DC bus and/or other suitable electrical comments for transferring electrical energy therebetween.

The higher voltage electric motor 106 is rotationally coupled (e.g., directly rotationally coupled) to a shaft 120 (e.g., an input shaft) in the gearbox 104. To elaborate, the higher voltage electric motor 106 is coupled to an end 122 of the shaft 120. The rotational coupling between the shaft 120 and the higher voltage electric motor 106 may be achieved via a splined interface, a sleeve, bolted flanges, combinations thereof, and the like.

The gearbox 104, in the illustrated example, is a single speed gearbox. However, the gearbox may be a multi-speed gearbox with clutches for shifting between different active gear ratios, in other examples. However, it will be understood the use of a single speed gearbox decreases the gearbox's complexity as well as the likelihood of component degradation, and increases the gearbox's space efficiency, if desired.

A gear 124 is fixedly coupled to the shaft 120 such that they rotate in unison. The gear 124 meshes with a gear 126 which is fixedly coupled to a shaft 128 (e.g., an intermediate shaft), in the illustrated example.

A lower voltage electric generator and motor assembly 130 is rotationally coupled to the shaft 128. To elaborate, a lower voltage generator 132 is rotationally coupled (e.g., directly rotationally coupled) to the shaft 128 at an end 134 of the shaft, in the illustrated example. In this way, the lower voltage assembly may be effectively incorporated into the gearbox. However, the lower voltage generator 132 may be coupled to the shaft in another suitable manner, in alternate examples. The lower voltage generator 132 is designed to convert rotational energy (transferred to the generator from the shaft) into electrical energy. As such, the generator may include a rotor and a stator that electromagnetically interact to provide this functionality.

In the illustrated example, the lower voltage electric generator and motor assembly 130 further includes a first lower voltage inverter 136 (e.g., a lower voltage generator drive). A lower voltage electrical connection 138 is established between the first lower voltage inverter 136 and the lower voltage generator 132. Bus bars, electrical wires, combinations thereof, and the like may be used to establish this electrical connection.

The first lower voltage inverter 136 may be electrically connected to a second lower voltage inverter 140 (e.g., a lower voltage motor drive) via an electrical connection 142 (e.g., a lower voltage DC bus and/or other suitable electrical components). Further, a lower voltage electric motor 144 may be electrically coupled to the second lower voltage inverter 140 via an electrical connection 146 (e.g., bus bars, electrical wires, combinations thereof, and the like). The lower voltage electric motor 144 includes a rotor and a stator.

In turn, the lower voltage electric motor 144 is rotationally coupled to an auxiliary device 148 via a mechanical connection 150. The auxiliary device 148 may be a hydraulic pump, a steering system, a parking brake system, combinations thereof, and the like. The lower voltage electric motor 144 may be incorporated into the auxiliary device 148, in one specific example. To expound, the lower voltage electric motor and the auxiliary device may be formed as one unit which may be housed in a common enclosure, for instance. In such an example, the auxiliary device and the lower voltage electric motor may be in the form of an electric pump, an electric parking brake, and the like.

A disconnect clutch 152 may further be included in the gearbox 104. The disconnect clutch 152 is configured to selectively rotationally decouple the shaft 128 from the lower voltage generator 132. The disconnect clutch 152 may be a dog clutch, in one example, or a friction clutch, in another example. Additionally, the disconnect clutch may be hydraulically, pneumatically, and/or electro-mechanically actuated.

The lower voltage electric generator and motor assembly 130 may function using electrical power in the range of 24-144 Volts (V), in one specific example. To expound, the lower voltage electric motor 144 may be supplied with electrical power in the range of 24-144 V (e.g., direct current voltage). On the other hand, the higher voltage electric motor 106 may function using electrical power which is greater than or equal to 400 V (e.g., direct current voltage). However, the higher and/or lower voltage components may be operated using other suitable voltages.

Another gear 154 may be fixedly coupled to the shaft 128. In the illustrated example, the gear 154 meshes with a gear 156 that is fixedly coupled to a shaft 158 (e.g., an output shaft). However, other geartrain architectures with a greater number of gears and/or an alternate gear layout have been envisioned. It will be appreciated, that the gears 124, 126, 154, and 156 may conceptually be included in a gear train 159.

The shaft 158 includes an output interface 160 at one end 162 and another output interface 164 at the opposite end 166. However, in alternate examples, the output shaft may include a single output interface or the output interface may be positioned in alternate suitable locations. The output interfaces 160 and 164 may be rotationally coupled to drive axle assemblies 168 as denoted via arrows 170. Shafts, joints, chains, belts, combinations thereof, and the like may be used to establish these mechanical connections. Each of the drive axle assemblies may include a differential, axle shafts (e.g., half shafts), and drive wheels, for instance.

Bearings may be coupled to each of the shafts in the gearbox to enable rotation thereof. To elaborate, bearings may be coupled to opposing sides of each of the gearbox shafts, in one specific example. However, other gearbox bearing arrangements may be used, in other examples. The gearbox 104 may include a housing 171 which may at least partially enclose the gearbox gears and the shafts.

The electric drive system 110 directly transfers power from the lower voltage generator 132 to the auxiliary device 148, in the illustrated example. In this way, the auxiliary device is efficiently driven by a lower voltage assembly. Further, in the illustrated example, a lower voltage battery has been omitted from the electric drive system. In this way, the complexity of the system is decreased and the space efficiency of the system is increased. However, in other examples, the vehicle may include a lower voltage energy storage device (e.g., lower voltage battery).

The vehicle 100 may further include a control system 190 with a controller 191 (e.g., a vehicle control unit (VCU)), as shown in FIG. 1. The controller 191 may include a microcomputer with components such as a processor 192 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data representing instructions that are executable by the processor for performing the methods and control techniques described herein as well as other variants that are anticipated but not specifically listed. As such, the control techniques, methods, and the like expanded upon herein may be stored as instructions in non-transitory memory.

The controller 191 may receive various signals from sensors 195 coupled to various regions of the vehicle 100. For example, the sensors 195 may include a pedal position sensor designed to detect a depression of an operator-actuated pedal such as an accelerator pedal and/or a brake pedal, speed sensor(s) at the transmission input and/or output shaft, a motor speed sensor, and the like. An input device 198 (e.g., accelerator pedal, brake pedal, drive mode selector, gear selector, combinations thereof, and the like) may further provide input signals indicative of an operator's intent for system control.

Upon receiving the signals from the various sensors 195 of FIG. 1, the controller 191 processes the received signals, and employs various actuators 196 of system components to adjust the components based on the received signals and instructions stored on the memory of controller 191. For example, the controller 191 may adjust the speed of the higher voltage electric motor 106 via adjustment of the higher voltage inverter 112. For instance, the controller 191 may determine that the electric motor's speed should be adjusted and responsive to such a determination the controller may send a command to the inverter to adjust electric motor speed. Other controllable components in the system may function in a similar manner with regard to sensor signals, control commands, and actuator adjustments, for example. For instance, the controller 191 may send control commands to the disconnect clutch 152 to engage and disengage the clutch. Further, in one specific operating mode, the lower voltage generator and motor assembly 130 may be operated as a pure electric motor to regenerate energy from the auxiliary device 148. For instance, in one use-case scenario, the auxiliary device may be a machine implement. To elaborate, the auxiliary device may be a loader that can be hydraulically raised and lowered and therefore includes a hydraulic pump and the lower voltage electric motor 144. In such an example, while the loader is lowering a load its potential energy may be regenerated by transferring mechanical power from the lower voltage generator 132 to the driveline in the gearbox 104 and from the driveline to the higher voltage electric motor 106. Then electrically energy may be transferred from the higher voltage energy storage device(s) 116 by way of the higher voltage inverter 112. In this way, the system may be regeneratively operated to recover energy from the auxiliary device, if desired.

An axis system is provided in FIG. 1, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

FIG. 1 provides for a method for operation of the electric drive system where mechanical power is transferred from the higher voltage electric motor to input shaft and mechanical power is transferred from the intermediate shaft to the lower voltage electric generator and motor assembly during an overlapping time interval. In this way, the system may provide motive power to the vehicle while powering the auxiliary devices, thereby increasing the system's adaptability.

Figure 2:
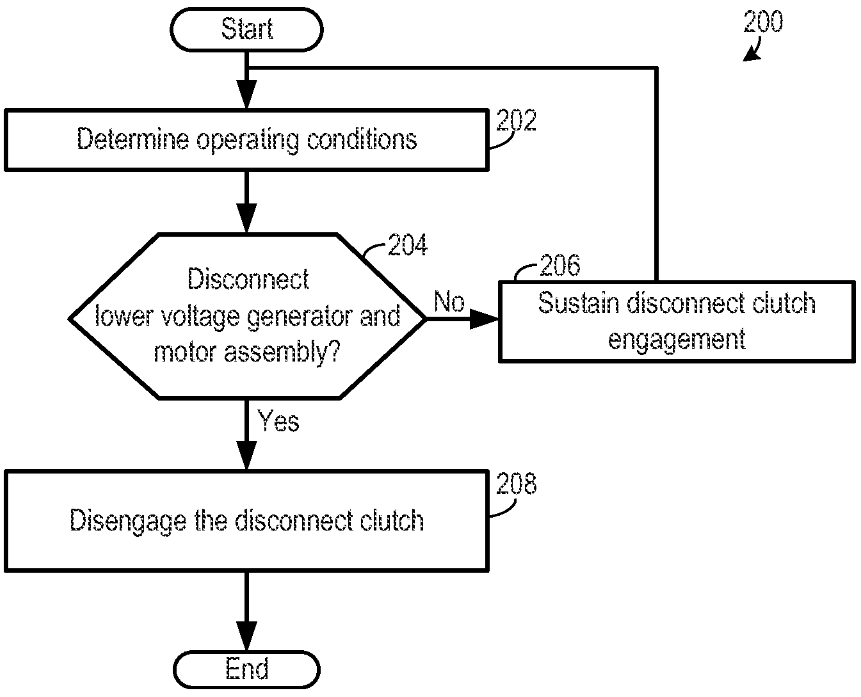
FIG. 2 shows a method for operation of an electric drive system.

FIG. 2 shows a method 200 for operation of an electric drive system. The method 200 may be carried out by the electric drive system 110 shown in FIG. 1, in one example. In other examples, the method 200 may be implemented by other suitable electric drive systems. Furthermore, the method 200 may be implemented by a controller that includes memory which holds instructions for the method steps that are executable by a processor, as previously indicated.

The method 200 illustrated in FIG. 2 includes at 202, determining operating conditions. The operating conditions may include auxiliary device load, auxiliary device speed, input device position (e.g., gearshift lever position), disconnect clutch configuration, accelerator pedal position, gearbox input/output speed, higher voltage motor speed, vehicle speed, vehicle load, ambient temperature, and the like. The operating conditions may be ascertained via sensor inputs, modeling, look-up tables, and/or other suitable techniques.

Next at 204, the method includes judging if the lower voltage generator and motor assembly should be disconnected from the gearbox. This judgement may take into account auxiliary device power demand, generator temperature, motor temperature, generator speed, motor speed, and the like. To elaborate, if the auxiliary device power demand is less than a threshold value (e.g., near zero or approaching zero) it may be determined that the lower voltage generator and motor assembly should be disconnected. Conversely, if the auxiliary device power demand is greater than the threshold value, it may be determined that the mechanical connection between the gearbox and the lower voltage generator and motor assembly should be sustained.

If it is determined that the lower voltage generator and motor assembly should not be disconnected from the gearbox (NO at 204) the method moves to 206 where the method includes sustaining engagement of the disconnect clutch in the gearbox. For instance, pressure in an actuation piston in the clutch may be sustained, in one use-case example.

Conversely, if it is determined that the lower voltage generator and motor assembly should be disconnected from the gearbox (YES at 204) the method moves to 208 where the method includes disengaging the disconnect clutch. For example, pressure in an actuation piston in the clutch may be decreased, in one use-case example. Method 200 allows the gearbox's efficiency to be increased. However, as previously indicated, the disconnect clutch may be omitted from the electric drive system in certain architectures.

The technical effect of the electric drive system operating methods described herein is to increase gearbox operating efficiency.

FIG. 1 shows example component configurations with relative positioning of the various components. If elements are shown directly contacting each other, or directly coupled to one another, then such elements may be referred to as directly contacting or directly coupled to one another, respectively, at least in one example. Similarly, elements shown contiguous or adjacent to one another may be referred to as contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred to as such, in one example. In other examples, elements offset from one another may be referred to as such. Even further, elements which are coaxial or parallel to one another may be referred to as such. Still further, an axis about which a component rotates may be referred to as a rotational axis.

The invention will be further described in the following paragraphs. In one aspect, an electric drive system is provided that comprises a gearbox including: a first shaft rotationally coupled to a higher voltage electric motor; and a second shaft rotationally coupled to a lower voltage electric generator and motor assembly; and an inverter electrically coupled to the higher voltage electric motor and an energy storage device; and wherein the lower voltage electric generator and motor assembly is configured to rotationally couple to an auxiliary device. In one example, the lower voltage electric generator and motor assembly may include: a lower voltage generator that is rotationally coupled to the second shaft; and a lower voltage electric motor electrically coupled to the lower voltage generator and rotationally coupled to the auxiliary device. In another example, the first shaft may be an input shaft. In yet another example, the second shaft may be an intermediate shaft. In yet another example, the electric drive system may further comprise an output shaft and a gear train which includes gears on the input shaft, the intermediate shaft, and the output shaft that mesh with one another. In yet another example, the electric drive system may further comprise a disconnect clutch configured to selectively disconnect the lower voltage electric generator and motor assembly from the second shaft. In yet another example, the system may include a controller with instructions that when executed, when a power demand from the auxiliary device is less than a threshold value, cause the controller to: disengage the disconnect clutch. In one example, the higher voltage electric motor may be a higher voltage traction motor. In yet another example, the electric drive system may be included in an all-electric vehicle. In yet another example, the all-electric vehicle may be an off-highway vehicle. In yet another example, the gearbox may be a single speed gearbox. In yet another example, the auxiliary device may be an electric pump, an electric actuator, an electric steering device, or an electric parking brake.

In another aspect, a method for operation of an electric drive system is provided that comprises transferring mechanical power from a higher voltage electric motor to a first shaft; and transferring mechanical power from a second shaft to a lower voltage electric generator and motor assembly; wherein the electric drive system includes: a gearbox comprising: the first shaft, the second shaft, the higher voltage electric motor, and the lower voltage electric generator; and an inverter electrically coupled to the higher voltage electric motor and an energy storage device; and wherein the electric generator and motor assembly is configured to rotationally couple to an auxiliary device. The method may further comprise, in one example, transferring electrical power from the lower voltage electric generator to the auxiliary device. The method may further comprise, in one example, disengaging a disconnect clutch which is coupled to the lower voltage electric generator and motor assembly and the second shaft. In one example, the first shaft may be an input shaft and the second shaft may be an intermediate shaft and wherein the electric drive system may further comprise an output shaft configured to rotationally couple to one or more axle assemblies. Further, in one example, a lower voltage generator in the lower voltage electric generator and motor assembly may generate a direct current (DC) voltage in a range of 24-144 volts (V).

In yet another aspect, an electric drive system is provided that comprises a gearbox including: an input shaft rotationally coupled to a higher voltage traction motor; and an intermediate shaft rotationally coupled to a lower voltage generator; an inverter electrically coupled to the higher voltage traction motor and an energy storage device; and wherein the lower voltage generator is electrically coupled to a lower voltage auxiliary motor; and wherein the lower voltage auxiliary motor is configured to rotationally couple to an auxiliary device. Further in one example, the inverter may be configured to supply electrical power to the higher voltage traction motor at a voltage that is greater than 400 volts (V); and the lower voltage electric generator may generate a direct current (DC) voltage in a range of 24-144 volts (V). Still further, in one example, the electric drive system may be included in an all-electric off-highway vehicle; and the gearbox may be a single speed gearbox.

In another representation, an electric gearbox is provided that includes a higher voltage traction motor which receives electrical power from a higher voltage battery via a higher voltage inverter and a lower voltage generator and motor assembly that drives an auxiliary device and does not includes a lower voltage battery.

Note that the example control and estimation routines included herein can be used with various system (e.g., powertrain) configurations. The control methods and routines disclosed herein may be stored as executable instructions in non-transitory memory and may be carried out by the control system including the controller in combination with the various sensors, actuators, and other system hardware in combination with the electronic controller. As such, the described actions, operations, and/or functions may graphically represent code to be programmed into non-transitory memory of the computer readable storage medium in the vehicle and/or powertrain control system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of traction motors, internal combustion engines in some instances, transmissions, and the like. The subject matter of the present disclosure includes all novel and non-obvious combinations and sub-combinations of the various systems and configurations, and other features, functions, and/or properties disclosed herein. Further, components that are The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric drive system, comprising:

a gearbox including:

a first shaft directly rotationally coupled to a higher voltage electric motor; and a second shaft directly rotationally coupled to a lower voltage electric generator and motor assembly; and an inverter electrically coupled to the higher voltage electric motor and an energy storage device;

wherein the lower voltage electric generator and motor assembly is configured to rotationally couple to an auxiliary device; and wherein the lower voltage electric generator and motor assembly includes:

a lower voltage generator that is directly rotationally coupled to the second shaft; and a lower voltage electric motor electrically coupled to the lower voltage generator and rotationally coupled to the auxiliary device.

2. The electric drive system of claim 1, wherein the first shaft is an input shaft.

3. The electric drive system of claim 2, wherein the second shaft is an intermediate shaft.

4. The electric drive system of claim 3, further comprising an output shaft and a gear train which includes gears on the input shaft, the intermediate shaft, and the output shaft that mesh with one another.

5. The electric drive system of claim 1, further comprising a disconnect clutch configured to selectively disconnect the lower voltage electric generator and motor assembly from the second shaft.

6. The electric drive system of claim 5, further comprising a controller including instructions that when executed, when a power demand from the auxiliary device is less than a threshold value, cause the controller to:

disengage the disconnect clutch.

7. The electric drive system of claim 1, wherein the higher voltage electric motor is a higher voltage traction motor.

8. The electric drive system of claim 1, wherein the electric drive system is included in an all-electric vehicle.

9. The electric drive system of claim 8, wherein the all-electric vehicle is an off-highway vehicle.

10. The electric drive system of claim 1, wherein the gearbox is a single speed gearbox.

11. The electric drive system of claim 1, wherein the auxiliary device is an electric pump, an electric actuator, an electric steering device, or an electric parking brake.

* * * * *